(12) United States Patent
Frazier

(10) Patent No.: US 11,880,018 B2
(45) Date of Patent: Jan. 23, 2024

(54) OPTICAL WINDOW WITH ABRASION TOLERANCE

(71) Applicant: Raytheon Company, Waltham, MA (US)

(72) Inventor: Gary A. Frazier, McKinney, TX (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 17/199,602

(22) Filed: Mar. 12, 2021

(65) Prior Publication Data
US 2022/0291421 A1    Sep. 15, 2022

(51) Int. Cl.
*G02B 1/115*    (2015.01)
*G01J 1/04*    (2006.01)
*B64C 1/14*    (2006.01)
*B64C 30/00*    (2006.01)

(52) U.S. Cl.
CPC ............ *G02B 1/115* (2013.01); *B64C 1/1484* (2013.01); *G01J 1/0407* (2013.01); *B64C 30/00* (2013.01)

(58) Field of Classification Search
CPC ...... B64C 30/00; B64C 1/1484; G01J 1/0437; G01J 1/0433; G01J 1/0407; G02B 1/10; G02B 1/11; G02B 1/113; G02B 1/14; G02B 1/115
See application file for complete search history.

(56) References Cited

U.S. PATENT DOCUMENTS 4,229,066 A * 10/1980 Rancourt ............ C03C 17/3452
359/359
5,268,217 A    12/1993 Kimock et al.
(Continued)

FOREIGN PATENT DOCUMENTS

CN    102449430    5/2012
CN    105973871    9/2016
(Continued)

OTHER PUBLICATIONS

Claims as filed of pending corresponding U.S. Appl. No. 17/199,604.
(Continued)

*Primary Examiner* — John R Lee
(74) *Attorney, Agent, or Firm* — Renner, Otto, Boisselle & Sklar LLP

(57) ABSTRACT

An optical window for a hypersonic vehicle includes a window substrate and an optical coating on the window substrate, with the coating including multiple alternating layers of different materials. The coating may have many layers, for example having five or more alternating bi-layers and may be configured to still perform its optical function with some of the layers removed, such as by ablation of some of the layers through exposure to hypersonic flow. The different materials of the different layers may have different properties, for example with one of the materials being more resistant to ablation and/or chemical reaction than another of the layers. Coatings for anti-reflection additionally include a region of graded optical index between the sequence of bi-layers and the substrate. The hypersonic vehicle may include an optical sensor which operates by receiving light through the optical window.

26 Claims, 6 Drawing Sheets

(56) References Cited

U.S. PATENT DOCUMENTS

| | | | |
|---|---|---|---|
| 5,457,471 A * | 10/1995 | Epperson, Jr. | H01Q 1/42 |
| | | | 244/159.1 |
| 6,019,755 A | 2/2000 | Steinert | |
| 6,261,152 B1 | 7/2001 | Aiyer | |
| 6,273,362 B1 * | 8/2001 | Fisch | H01Q 1/422 |
| | | | 343/705 |
| 8,199,321 B2 | 6/2012 | Yoo et al. | |
| 8,358,467 B2 * | 1/2013 | Yan | C08J 7/046 |
| | | | 359/581 |
| 8,470,439 B2 * | 6/2013 | Walker, Jr. | G02B 1/111 |
| | | | 977/773 |
| 10,138,159 B2 * | 11/2018 | Ding | C03C 17/366 |
| 10,254,445 B2 * | 4/2019 | Khan | G02B 1/115 |
| 10,422,928 B2 * | 9/2019 | Khan | C23C 14/06 |
| 10,442,549 B2 * | 10/2019 | Bimanand | B64C 1/1484 |
| 10,816,703 B2 * | 10/2020 | DeCoux | G02B 5/0833 |
| 10,897,028 B2 * | 1/2021 | Khan | H01L 51/0096 |
| 11,112,672 B2 * | 9/2021 | Hosseini | G02F 1/19 |
| 11,261,128 B2 * | 3/2022 | Lee | G02B 1/115 |
| 2004/0173155 A1 * | 9/2004 | Nishimoto | H01J 37/32972 |
| | | | 118/715 |
| 2005/0019571 A1 * | 1/2005 | Mulligan | H01L 41/082 |
| | | | 428/375 |
| 2005/0026085 A1 | 2/2005 | Myung | |
| 2005/0036135 A1 | 2/2005 | Earthman et al. | |
| 2007/0296966 A1 | 12/2007 | Benicewicz et al. | |
| 2012/0000893 A1 | 1/2012 | Broude et al. | |
| 2012/0021539 A1 | 1/2012 | Allenic et al. | |
| 2013/0059499 A1 | 3/2013 | Benvegnu et al. | |
| 2015/0346089 A1 | 12/2015 | Ishikawa et al. | |
| 2016/0319135 A1 * | 11/2016 | Hecht | C09D 5/18 |
| 2017/0015600 A1 * | 1/2017 | Schaedler | C04B 41/52 |
| 2019/0285785 A1 * | 9/2019 | Ockenfuss | G02B 5/281 |
| 2020/0233131 A1 * | 7/2020 | Banaei | G02B 5/28 |
| 2020/0390606 A1 | 12/2020 | Magnusson | |
| 2021/0011203 A1 * | 1/2021 | Sun | G02B 1/14 |
| 2021/0263201 A1 * | 8/2021 | Nguyen | G02B 5/285 |
| 2021/0340067 A1 * | 11/2021 | Boakye | C04B 35/62675 |
| 2022/0033999 A1 * | 2/2022 | Maxwell | C04B 35/62286 |
| 2022/0291125 A1 * | 9/2022 | Frazier | G01N 21/55 |
| 2022/0291421 A1 * | 9/2022 | Frazier | G02B 5/285 |

FOREIGN PATENT DOCUMENTS

| | | |
|---|---|---|
| CN | 113740319 | 12/2021 |
| DE | 1809459 A1 | 6/1970 |
| DE | 102016109303 | 11/2017 |
| GB | 2225449 A | 3/1990 |
| JP | H08 55991 A | 2/1996 |
| JP | 2009107484 A | 5/2009 |
| WO | 2020163963 | 8/2020 |
| WO | 2020/256946 A1 | 12/2020 |

OTHER PUBLICATIONS

Tilsch M et al: "Optical interference coatings design contest 2007: triple bandpass filter and nonpolarizing beam splitter", Applied Optics, Optical Society of America, Washington, DC, US, vol. 47, No. 13, May 1, 2008 (May 1, 2008), pp. C55-C69, XP001514417, ISSN: 0003-6935, DOI: 10.1364/A0.47.000C55 p. C66, left-hand column.

International Search Report and Written Opinion dated Jun. 1, 2022 in corresponding International Application No. PCT/US2020/018638.

International Search Report and Written Opinion dated May 24, 2022 in corresponding International Application No. PCT/US202/018640.

* cited by examiner under OPTICAL WINDOW WITH ABRASION
TOLERANCE

FIELD OF THE INVENTION

The invention is in the field of windows for sensors, such as for hypersonic vehicles.

DESCRIPTION OF THE RELATED ART

Hypersonic flow is a harsh environment, one that can cause damage to optical windows and to coatings applied to optical windows. The damage can be mechanical, such as erosion or ablation, chemical, such as plasma etching due to ionization of the flow past a hypersonic vehicle that includes the window, and/or thermal, such as heating to the glass transition temperature due to friction.

Optical windows are usually coated with additional materials to modify the amount of incident light reflected from or transmitted through each of the window surfaces. These added materials are usually deposited in the form of thin films and are known as anti-reflection or blocking coatings. Anti-reflection coatings are applied to minimize optical reflection at one or more wavelengths and blocking coatings are applied to maximize the reflectance of windows at one or more wavelengths. Reducing reflectance may enhance the transmittance of wanted light to a sensor while increasing reflectance may block unwanted light from reaching a sensor.

In addition to modifying the optical properties of a window, coatings also may provide increased durability of the window system against damage due to the atmospheric environment. Many window materials in wide use are relatively soft and easily abrade when exposed to rain or sand impact. Other window materials are easily removed by plasma etching or reaction with atmospheric water and/or oxygen. Coating materials are typically selected to provide an optical advantage and increase the resistance of the window system to ablation, chemical reaction, and erosion. In some cases however, the environment of the window system is so harsh that the ablation of the window over time is unavoidable and the standard coatings used for anti-reflection or blocking eventually erode over time. An example is the oxidation (burnoff) that results when a window is immersed in a very high temperature oxygen environment. The coating may just begin to burn away. The erosion of the coating may occur within a single flight of a vehicle outfitted with the window or happen after a number of sequential flights. The damage to the coating and window eventually become so great as to require a replacement of the window usually at great cost and down time.

The ablation of existing coating designs tend to cause significant changes to the optical performance of a window. Even the removal of one micrometer of material can cause dramatic changes to the reflectance and transmittance of a standard coating. Thus there is a need to provide anti-reflection and/or blocking coatings which degrade gracefully their optical performance under ablation and other erosion mechanisms.

SUMMARY OF THE INVENTION

An optical window, such as for a hypersonic vehicle, has a substrate, and multiple alternating layers of different materials atop the substrate.

An optical window includes multiple alternating layers of different materials, some of which may be removed during hypersonic flight, while still allowing for acceptable optical performance, such as for use with a sensor that receives light through the window.

According to an aspect of the invention, an optical window includes: multiple alternating layers of different materials; wherein the optical window maintains predetermined optical characteristics as some but not all of the multiple layers, including at least one of the layers of each of the different materials, are removed.

According to an aspect of the invention, an optical window includes: multiple alternating layers of different materials; a region of graded optical index of refraction; wherein the optical window maintains predetermined optical characteristics as some but not all of the multiple layers, including at least one of the layers of each of the different materials, are removed.

According to an embodiment of any paragraph(s) of this summary, the window further includes a window substrate to which the coating is applied.

According to an embodiment of any paragraph(s) of this summary, the multiple alternating layers constitute an anti-reflection coating on a major surface the window substrate.

According to an embodiment of any paragraph(s) of this summary, the anti-reflection coating is configured to operate anti-reflectively when some of the layers are removed.

According to an embodiment of any paragraph(s) of this summary, the anti-reflection coating is configured to operate anti-reflectively when some of the layers are ablated.

According to an embodiment of any paragraph(s) of this summary, the band reject (blocking) coating is configured to operate to substantially reflect light within a band of wavelengths when some of the layers are ablated.

According to an embodiment of any paragraph(s) of this summary, the multiple alternating layers include at least 5 layers of the different materials.

According to an embodiment of any paragraph(s) of this summary, the region of graded index of refraction in the anti-reflection coating is at least as thick as the free space wavelength of the longest wavelength within the anti-reflection band.

According to an embodiment of any paragraph(s) of this summary, the materials that make up the multiple alternating layers have the same thickness for the same material.

According to an embodiment of any paragraph(s) of this summary, some of the layers have different thicknesses than other of the layers.

According to an embodiment of any paragraph(s) of this summary, the materials that comprise the multiple alternating layers each have an optical thickness on the order of one quarter or one half of the operational free space wavelength.

According to an embodiment of any paragraph(s) of this summary, the materials for the layers includes materials selected from a group comprising MgO, $ZrO_2$, $Y_2O_3$, $Dy_2O_3$, $MgF_2$, $ZrO_2{:}Y_2O_3$ composites, Lanthanide series oxides, fluorides, and oxyfluorides, diamond, sapphire, and nanocomposites.

According to an embodiment of any paragraph(s) of this summary, one of the materials may be more ablation-resistant than another of the materials.

According to an embodiment of any paragraph(s) of this summary, one of the materials may be less ion-reactive than another of the materials.

According to an embodiment of any paragraph(s) of this summary, one of the materials may have less optical absorption in the wavelength band of interest than another of the materials.

According to an embodiment of any paragraph(s) of this summary, the window is configured to operate with some of the layers removed.

According to an embodiment of any paragraph(s) of this summary, the window is a multi-use window.

According to an embodiment of any paragraph(s) of this summary, the layers are vacuum-deposited layers.

According to an embodiment of any paragraph(s) of this summary, the layers may be deposited by epitaxial growth.

According to an embodiment of any paragraph(s) of this summary, the layers may be deposited by chemical vapor deposition.

According to an embodiment of any paragraph(s) of this summary, the window is part of a hypersonic vehicle.

According to an embodiment of any paragraph(s) of this summary, the hypersonic vehicle includes a sensor that views through the optical window.

According to another aspect of the invention, a method of optical sensing from a hypersonic vehicle includes: receiving light at a sensor of the hypersonic vehicle, through an optical window of the hypersonic vehicle; wherein the optical window includes at least repeating alternate layers of different materials; and wherein, while receiving the signals, hypersonic flow past the window removes some of the layers of the window, while leaving in place other of the layers of the window.

According to an embodiment of any paragraph(s) of this summary, the window is unshrouded throughput flight of the hypersonic vehicle.

According to an embodiment of any paragraph(s) of this summary, the method further includes re-using of the window in another flight of the hypersonic vehicle, after the some of the layers of the window have been removed.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

An optical window for a hypersonic vehicle includes a window substrate and an optical coating on the window substrate, with the coating including multiple alternating layers of different materials. The coating may have many layers, for example having five or more alternating bi-layers and may be configured to still perform its optical function with some of the layers removed, such as by ablation of some of the layers through exposure to hypersonic flow. The different materials of the different layers may have different properties, for example with one of the materials being more resistant to ablation and/or chemical reaction than another of the layers. Coatings for anti-reflection additionally include a region of graded optical index between the sequence of bi-layers and the substrate. The hypersonic vehicle may include an optical sensor which operates by receiving light through the optical window. The use of an optical coating with multiple layers may allow the sensor to operate earlier in the flight of the hypersonic vehicle, and/or for a greater duration during the flight of the hypersonic vehicle. The multi-layer optical coating may also enable re-use of the optical window in multiple flights of the hypersonic vehicle. The use of the multi-layer optical coating, with the acceptance of the inevitability of the ablation of some of the layers, while the remaining layers still provide acceptable optical performance, enables use in the coating of ion-reactive materials such as $MgO$ and $ZrO_2$, which have desirable optical and thermal properties that would otherwise be unacceptable for use in hypersonic coatings.

Figure 1:
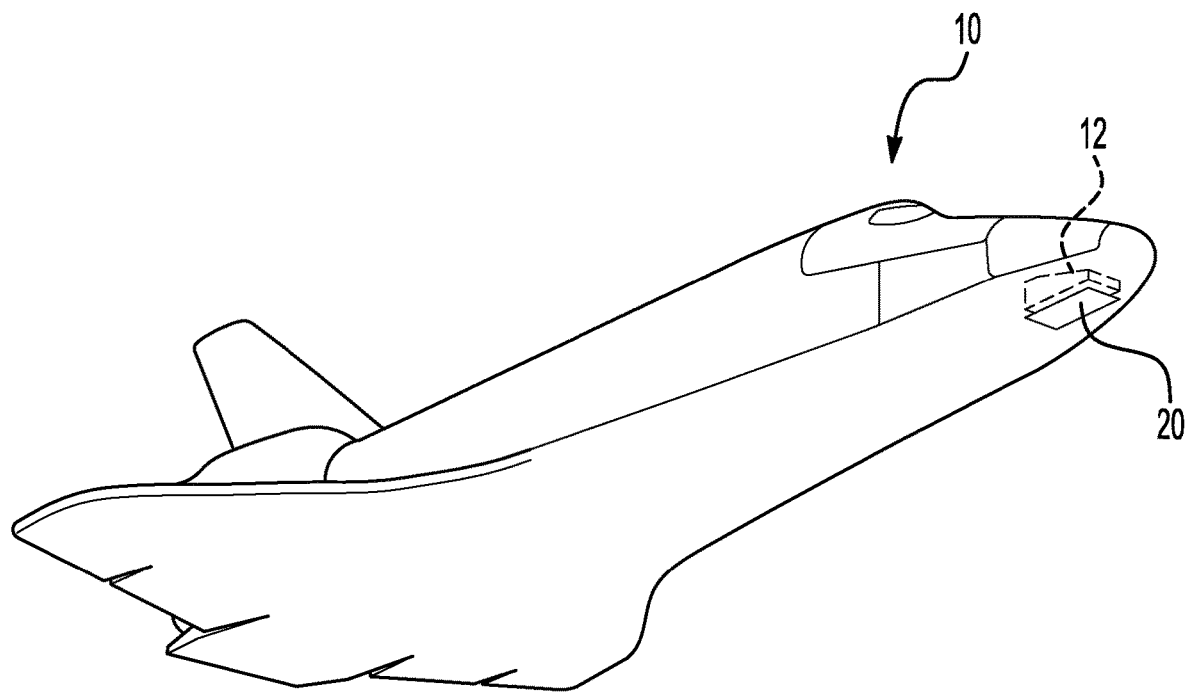
FIG. 1 is an oblique view of a hypersonic vehicle that includes an optical window according to an embodiment of the present invention.

FIG. 1 shows a hypersonic vehicle 10 that includes a sensor 12. The sensor 12 transmits and/or receives information (light) through an optical window 20, during flight of the hypersonic vehicle 10. The sensor 12 may be any of a variety of optical sensors, such as passive staring imagers, gimballed imagers, and active sensors such as laser-emitting infrared search and track systems. The term "optical sensor," as used herein, is intended to broadly cover sensors that operate on light and/or signals at any of a wide range of frequencies, including both visible, infrared, and ultraviolet radiation.

Figure 2:
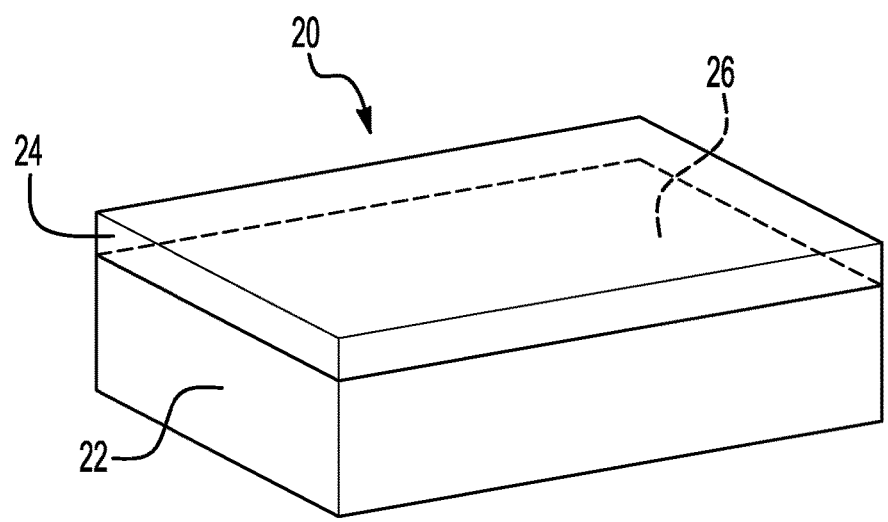
FIG. 2 is an oblique view of the optical window of FIG. 1.
Figure 3A:
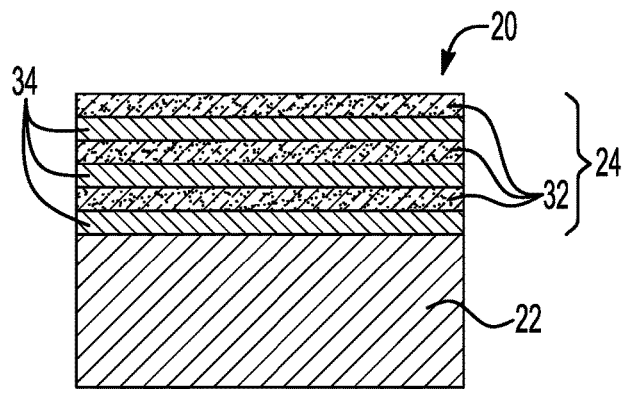
FIG. 3A is a magnified side view of a portion of a first embodiment of the optical window of FIG. 2.
Figure 3B:
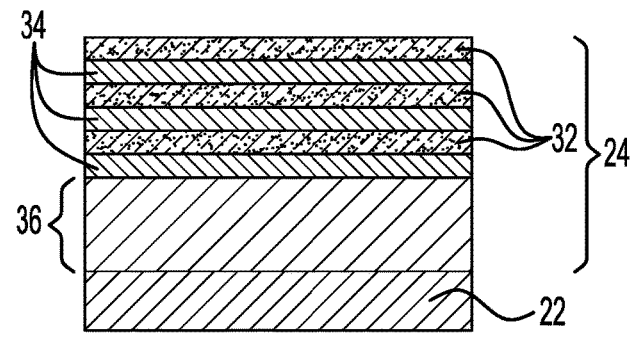
FIG. 3B is a magnified side view of a portion of a second embodiment of the optical window of FIG. 2.
Figure 3C:
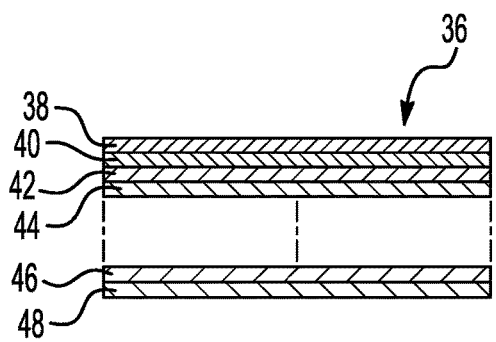
FIG. 3C is a magnified side view of a portion of a third embodiment of the optical window of FIG. 2.
Figure 3D:
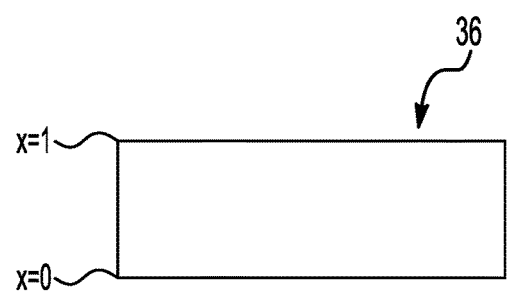
FIG. 3D is a magnified side view of a portion of a fourth embodiment of the optical window of FIG. 2.

With reference now in addition to FIGS. 2 and 3A-3D, the optical window 20 includes a window substrate 22, and an optical coating 24 on a major surface 26 of the window substrate 22. Surface 26 is potentially exposed during flight to possibly detrimental environmental effects. The window substrate 22 may be any of a variety of known materials with suitable optical properties, for example zinc sulfide, zinc selenide, sapphire, fused silica, germanium, gallium arsenide, silicon, one of a variety of optical nanocomposites, and diamond. The optical coating 24 includes a series of repeated layers of different materials, for example alternating layers of a first material (first material layers 32) and a second material (second material layers 34) and a material with a graded optical index of refraction 36 (FIGS. 3B-3D). Bi-layers such as those shown in FIGS. 3A-3D are common options in terrestrial optical band-pass, low-pass, and high-pass filters. Two materials are contained within a vacuum system and alternately evaporated or sputtered onto the substrate and prior coatings to produce a binary structure of two materials with thicknesses determined by the desired operating wavelength(s) of the overall sensor system. For example, repeating a two-layer unit cell consisting of two materials such as MgO and $Dy_2O_3$ may be used to provide simultaneously a set of wavelengths that are highly reflected by the overall coating and a different set of wavelengths that are efficiently transmitted by the overall coating. An example sequence for such as coating may be, alternating layers of MgO and $Dy_2O_3$ (with a layer of MgO as the outermost layer, on a germanium substrate.

However the repeated deposition of just two different materials is not mandatory, and repeating structures of a unit cell consisting of three, four, or more layers can be used to produce the desired optical response. For example, repeating a three-material stackup of $ZrO_2$, $MgF_2$, and MgO may be used to create a band-reject characteristic in the long wave infrared band (8.0-12.0 micrometers of wavelength), which has superior reflection characteristics than a simpler bi-layer of $ZrO_2$ and MgO. An example sequence for such a coating structure may be successive repeated layers of a stack of $ZrO_2$, $MgF_2$, and MgO, with a layer of $ZrO_2$ as the outermost layer, on a ZnS substrate The optical coating 24 serves (or may serve) several purposes. First of all the coating 24 protects the underlying window substrate 22 from damage from the environment, such as sand and rain erosion. In addition the optical coating 24 provides desired optical characteristics to the optical window 20, for example allowing transmission (and preventing reflection) of incoming radiation of a desired range of wavelengths. For example the sensor 12 (FIG. 1) may be configured to detect radiation in a certain wavelength range, and the coating 24 may provide preferential transmission of radiation in that wavelength range. Generally, typical wavelength ranges of interest are the short wave infrared (SWIR: 1-3 μm), mid-wave infrared (MWIR: 3-5 μm), and long-wave infrared (LWIR: 8-12 μm). However, new wavebands may become of interest in the future including the ultraviolet band (<0.3 μm) and the TeraHertz (THz) band between 30 μm and 1000 μm.)

In some instances it is desirable to prevent radiation, such as from a high intensity laser, from passing through the window and illuminating the sensor detector. The optical coating 24 may provide different desired optical characteristics to the optical window 20, for example enhancing reflection (and preventing transmission) of incoming radiation of a desired range of wavelengths.

The optical coating 24 is configured to maintain its transmission and reflection characteristics even as some of the layers are abraded away by exposure to the environment, such as by exposure to the hypersonic flow past the hypersonic vehicle 10 (FIG. 1). The hypersonic flow may pose a particular ablation problem by exposing the outer surface of the window 20 to hot ionized gases. The use of multiple repeated layers in the anti-reflection coating 24 allows the lower layers to maintain the same (or substantially the same, or similar) optical properties of the coating 24, as long as some of the layers are still present. In one sense the upper (outermost) layers of the coating 24 may be considered "sacrificial," in that it is expected that such layers will be removed (abraded away) during normal operation. However from a different perspective all of the layers of the coating 24 are (or potentially are) optically operational, in that at any one time the aggregate of layers of the coating 24 with the substrate 22 may determine the optical effects in terms of reflection and transmission. As the layers are gradually removed by the chemical action of hot, ionized gases, different initially inner layers of the coating 24 become the outermost layers without substantially (or acceptably) changing the overall optical effectiveness.

The different materials for the layers 32 and 34 may have different characteristics, which together may provide desirable properties to the anti-reflection coating 24. For example one of the materials may have better optical properties than the other, and/or one of the materials may have better resistance to ablation/erosion from hot, ionized gases than the other. The combination of materials with different characteristics may enhance the overall performance of the coating 24. For example the first material may be a material with good optical properties in the MWIR such as MgO, but poor resistance to ablation by hot water vapor, and the second material may have (relatively) poorer optical properties, but good resistance to ablation to water vapor such as zirconia, yttria, or dysprosium. Together the combination of alternating layers of two such materials may make for a coating that has both good anti-reflection or band-rejecting properties, while still having good resistance to ablation/erosion from hot, ionized atmospheric gases from hypersonic flow.

It not required to only choose materials that are combined to provide the highest practical environmental durability. In particular, it is not essential to pair materials that have excellent optical performance but poorer environmental durability and vice versa. Materials may be selected which are known to abrade under hypersonic flow because the repetition of unit cells in the optical coating allows abrasion of the uppermost layers such that optical performance slowly degrades.

Any of a variety of materials, and combinations of materials, may be used for the layers 32 and 34 of the coating 24. Examples of suitable materials include MgO, $ZrO_2$, $Y_2O_3$, diamond, $MgF_2$, $YF_3$, $Al_2O_3$, and $Dy_2O_3$. Examples of suitable combinations of materials include MgO and $Dy_2O_3$, and $Al_2O_3$ and $MgF_3$. Oxides, fluorides, and oxyfluorides of many metals including the Lanthanide series may be used for coatings that require transparency in the infrared. Metal Fluorides are also typically used for infrared coatings. Fluorides tend to have relatively low indexes of refraction (in the range of 1.3-1.6) in the infrared while oxides tend to have relatively higher indexes of refraction (in the range of 1.6-1.9). Alternating layers of oxides and fluorides may be used to provide the unit cell consisting of the pairing of layers 32 and 34. Many oxides are mechanically harder than many fluorides but many fluorides are less susceptible to erosion due to etching by the oxygen plasma characteristic of hypersonic flow.

The layers 32 and 34 may have any of a variety of suitable thicknesses. For example the layers 32 and 34 each may be on the order of one quarter to one half of an optical wavelength for use as infrared anti-reflection coatings. The specific thickness of each material 32 or 34 may be determined by suitable computer simulations. One example of an optically-blocking multilayer uses alternating layers of different materials that are each one quarter of an optical wavelength within the material. The optical thickness of a material is given as the product of the index of refraction and the geometric thickness:

$$t_{optical} = nt_{geometric} \quad (1)$$

where n is the index of refraction and $t_{geometric}$ is the geometric thickness. The geometric thickness of a material that is optically ¼ of a wavelength thick is:

$$t_{geometric} = t_{optical}/4n \quad (2)$$

As examples, a thin film layer of MgO which has an index of refraction of 1.475 at 8.0 µm of wavelength and a thickness of 1.356 µm would be optically ¼ wavelength in thickness at this wavelength. A layer of $Dy_2O_3$ which has an index of refraction of 1.751 at 8.0 µm of wavelength would, at this wavelength, have an optical thickness of one half wavelength if its physical (geometric) thickness was 2.284 µm.

In a preferred embodiment a band reject (blocking) coating with high reflectivity is composed of a series of repeated layers of two different materials each with an optical thickness of one quarter of a wavelength at the center of the spectral band that must be rejected. A pair of such materials forms a unit cell. The unit cells are repeated by sequential assembly such as by vacuum deposition until the total thickness of the stack of unit cells exceeds the maximum expected depth of ablation of the coating during use. FIG. 3A shows such an embodiment, with the coating 24 composed of alternating layers of the materials 32 and 34, atop the substrate 22.

In a second preferred embodiment a bandpass anti-reflection coating with low in-band reflectivity is composed of a series of repeated layers of two different materials the first with an optical thickness of one quarter of a wavelength at the center of the spectral passband and the second with an optical thickness of one-half wavelength at the center of the spectral passband. A pair of such materials forms a unit cell. The unit cells are repeated by sequential assembly such as vacuum deposition until the thickness of the stack of unit cells exceeds the maximum expected depth of ablation of the coating during use. A graded index of refraction region uses materials that grade the index of refraction from either the first or second unit cell materials to that of the substrate. The distance (thickness) over which the index of refraction is graded is preferably equal to or greater than the longest wavelength that must be passed by the window system.

FIGS. 3B-3D show details of embodiments involving the graded index of refraction region 36. FIG. 3B shows the region 36 as underneath the material layers 32 and 34, as part of the coating 24, between the layers 32 and 34, and the substrate 22. FIG. 3C shows the graded index of refraction region 36 as consisting of a series of layers 38, 40, 42, 44, 46, and 48 as part of a series of layers grading the index of refraction from the material layers 32 or 34, and the substrate 22. The change of composition in the graded index of refraction region 36 is illustrated in FIG. 3D.

Figure 4A:
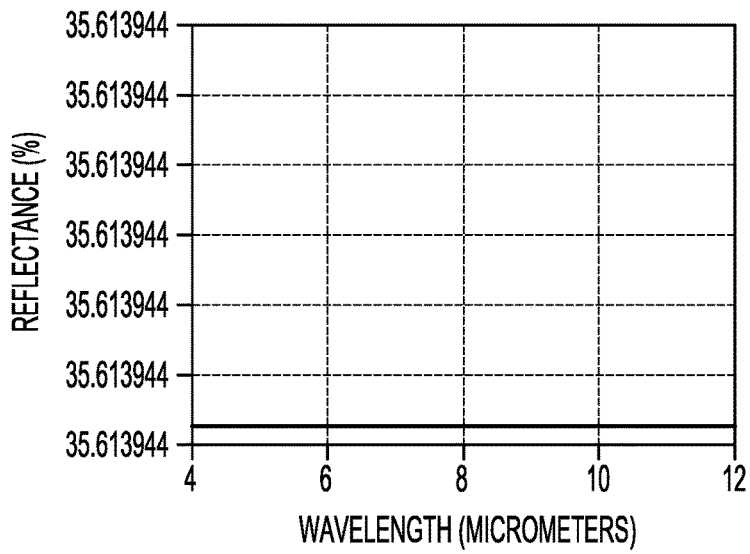
FIG. 4A is a graph of optical reflectance of an uncoated germanium window substrate.
Figure 4B:
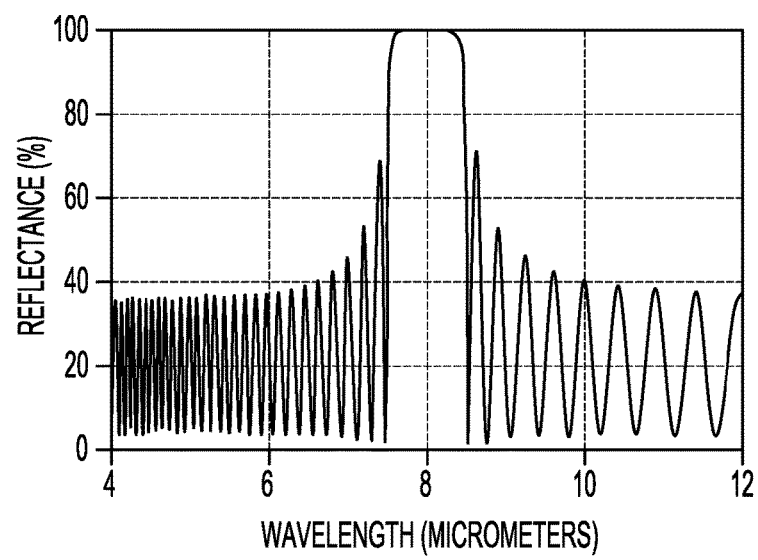
FIG. 4B is a graph of optical reflectance of a germanium window substrate coated with 30 pairs of an $MgO$—$Dy_2O_3$ bi-layer, according to an embodiment of the invention.
Figure 4C:
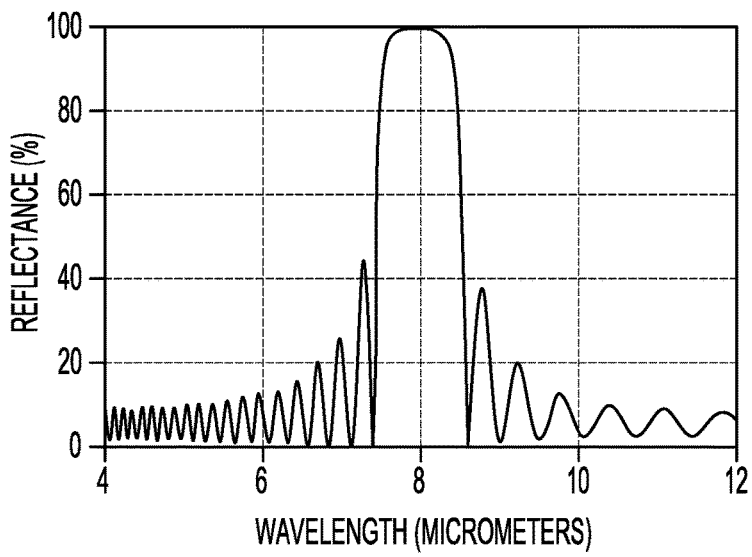
FIG. 4C is a graph of optical reflectance of a germanium window substrate coated with 20 pairs of an $MgO$—$Dy_2O_3$ bi-layer, according to an embodiment of the invention.

FIGS. 4A-4C illustrate an example configuration for a band rejecting window system optimized to reject 8.0 µm laser radiation. This example corresponds to the coating structure described in FIG. 3A. FIG. 4A shows the optical reflectance of an uncoated Germanium window substrate. The average reflectance at normal incidence in the 7.5-8.5 µm band is 35.6%.

FIG. 4B shows a germanium substrate coated with an outer region of 30 pairs of an MgO—$Dy_2O_3$ bi-layer, with the MgO layers having a thickness of 1.356 µm, and with the $Dy_2O_3$ layers having a thickness of 1.135 µm. The average reflectance of this coating in the 7.9-8.1 µm band is 99.98%.

FIG. 4C shows a germanium substrate coated with an outer region of 20 pairs of an MgO and $Dy_2O_3$ bi-layer, again with the MgO layers having a thickness of 1.356 µm, and with the $Dy_2O_3$ layers having a thickness of 1.135 µm. The average reflectance of this coating in the 7.9-8.1 µm band is 99.4%. It can be seen from FIGS. 4B and 4C that the removal (ablation) of ten MgO/$Dy_2O_3$ bi-layers has minimal effect upon the band rejecting characteristic of the coating. In this example, 10 unit cells is equivalent to 10*(1.356+1.1135) µm, or 24.9 µm of ablation.

Figure 5A:
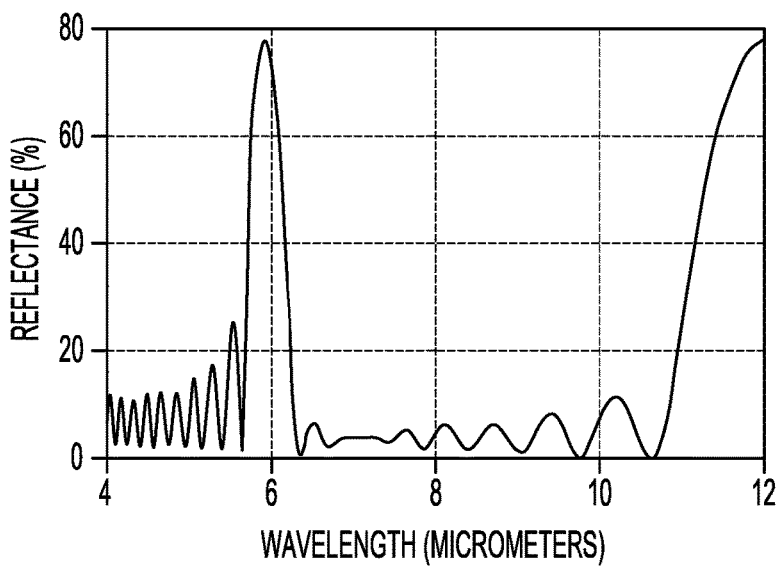
FIG. 5A is a graph of optical reflectance of a germanium window substrate coated with 10 pairs of an $MgO$—$Dy_2O_3$ bi-layer, according to an embodiment of the invention.
Figure 5B:
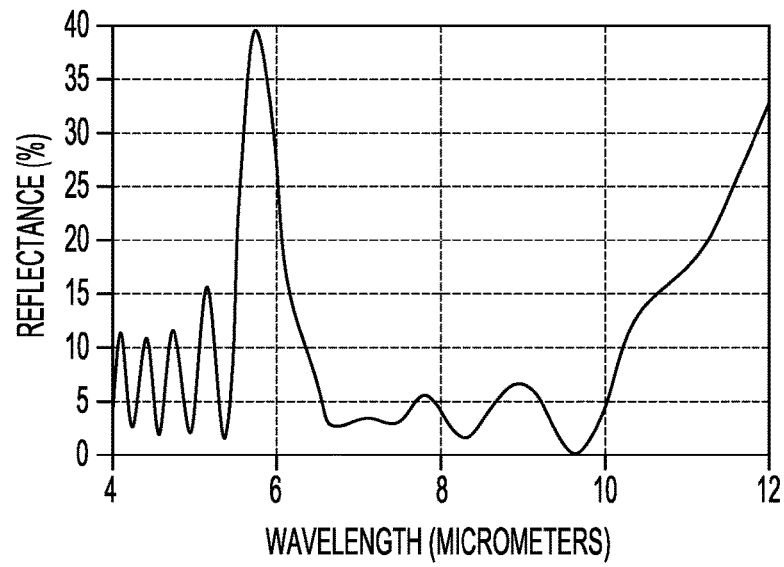
FIG. 5B is a graph of optical reflectance of a germanium window substrate coated with 5 pairs of an $MgO$—$Dy_2O_3$ bi-layer, according to an embodiment of the invention.
Figure 5C:
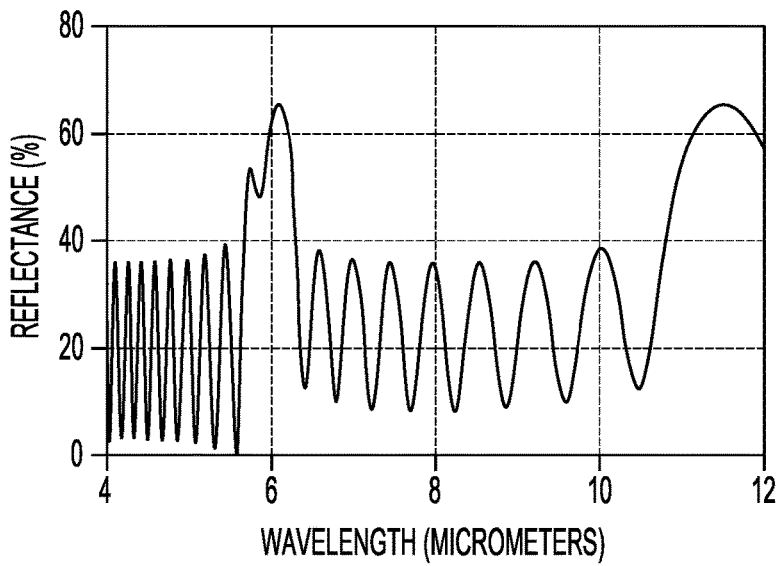
FIG. 5C is a graph of optical reflectance of a germanium window substrate coated with pairs of an $MgO$—$Dy_2O_3$ bi-layer, showing the effect of removal of a graded index of refraction between the bi-layers and the substrate.

FIGS. 5A-5C shows an example design for an anti-reflection coating that provides a bandpass optical characteristic optimized to pass 8.0 µm radiation. This example corresponds to the coating structure described in FIG. 3B. Recall from FIG. 4A that the optical reflectance at normal incidence of an uncoated germanium window substrate in the 7.5-8.5 µm band is flat at 35.6%. FIG. 5A shows a germanium substrate coated with an outer region of 10 pairs of an MgO and $Dy_2O_3$ bi-layer on top of a region of graded index of refraction. The MgO layers are one quarter optical wavelength thick at 8.0 µm, for example being 1.356 µm thick. The $Dy_2O_3$ layers are one half optical wavelength thick at 8.0 µm, for example being 2.27 µm thick. The graded index of refraction region underneath the MgO—$Dy_2O_3$ bi-layers may have a graded index of refraction from n=1.356 to n=3.96, over a thickness of 8 µm. The germanium substrate has an index of refraction n=3.96. The average reflectance of this coating in the 7.5-8.5 µm band is 3.8%.

FIG. 5B shows a germanium substrate coated with an outer region of five pairs of an MgO and $Dy_2O_3$ bi-layer, with the same thicknesses as described above with regard to FIG. 5a, and with the same graded index of refract between the germanium substrate and the MgO—$Dy_2O_3$ bi-layers. The average reflectance of this coating in the 7.5-8.5 µm band is 3.6%. Thus it is seen the removal of 5 bi-layers of MgO/$Dy_2O_3$ has minimal effect upon the average in-band anti-reflection characteristic of this coating. In this example, 5 unit cells is equivalent to 5*(1.356+2.27) µm, or 18.1 µm of ablation.

FIG. 5C shows the effect of eliminating the region of graded index of refraction from the configuration described above. The optical discontinuity between the stack of MgO/$Dy_2O_3$ bi-layers and the germanium substrate degrades the anti-reflection characteristic of the coating. The average reflectance of this design with the graded material removed is 25.6% in the 7.5-8.5 µm band. This shows that an efficient anti-reflection characteristic benefits from grading the index of refraction between the bi-layer stack and the substrate. It is therefore advantageous to include a region of graded index of refraction between the sequence of multilayers and the substrate.

Generally the layers 32 and 34 will not have the same thickness as they will be composed of materials with different indexes of refraction and the optical thickness of these layers will be either one quarter or one half of a selected wavelength. These thicknesses correspond to a preferred embodiment where the reflectance or transmission through the window system is to be optimal. In some cases an optimal set of optical thicknesses may not be required for a particular optical requirement and the thicknesses may be selected for convenience of assembly.

The layers 32 and 34 may all have the same thickness, or the thickness of the first material layers 32 may be different from the thickness of the second material layers 34. All of the first material layers 32 may have the same thickness, or they may be different thicknesses for different of the first material layers 32, for example different thicknesses based on height in the anti-reflection coating 24. Similarly, all the second material layers 34 may have the same thickness, or they may be different thicknesses for different of the second material layers 34.

Characteristics for the materials for the material layers 32 and 34 may include optical properties, including reflection and transmission characteristics for frequencies of interest; as well as resistance to mechanical abrasion/erosion, to chemical reactions/erosion, and/or to degradation from thermal effects. Resistance to mechanical abrasion/erosion may be quantified in terms of Knoop hardness. Examples of materials exhibiting good resistance to mechanical erosion include diamond, $Al_2O_3$, $ZrO_2$, $Dy_2O_3$, and combinations of such materials in the form of nanocomposites or co-deposited alloys. Examples of materials exhibiting good resistance to chemical erosion from hypersonic flows include diamond and metal fluorides such as $MgF_2$, $YF_3$, $YbF_3$, and $PrF_3$. All of the above materials are examples of materials that exhibit good optical properties for at least some relevant sensors.

The coating 24 may advantageously provide the ability to use ion-reactive materials with good optical and thermal properties, such as MgO and $ZrO_2$, that would otherwise not be considered suitable for use in coatings exposed to hypersonic air flows. The coating 24 with its many layers 32 and 34, is able to retain its desirable antireflective properties even after some of the layers have been removed, the ion-reactive properties of such materials is less of a liability, and the better optical properties may be used to improve the optical performance of the coating 24.

The layers 32 and 34 may be deposited using any of a variety of suitable processes. For example vapor deposition processes may be used to sequentially deposit the layers 32 and 34, to build up the coating 24 from the window substrate 22 onward. Graded indexes of refraction can be provided using co-deposition of two materials where the mass fraction of one material versus the other varies over the time of deposition. Index of refraction grading on semiconductor substrates may be provided by epitaxial growth of alloys with stoichiometries that vary during the deposition. For example, an index of refraction gradient may be produced on a gallium arsenide substrate by growing Aluminum Gallium Arsenide ($Al_XGa_{1-X}As$) where X varies from initially X=0 (GaAs) up to X=1 (AlAs) during the growth operation.

The multiple-layer coating may enable earlier and/or longer use of the sensor 12 (FIG. 1) during flight of the flight vehicle 10. In some present systems optical windows for sensors are protected by a shroud until a certain stage of flight, such as when the threat of erosion has been reduced or when the need for sensor use is at its maximum, with only a short use of the sensor use possible before the window is eroded to the extent that the optical properties are undesirably degraded. The coating 24, with its ability to perform well optically even when some of the layers 32 and 34 are removed, may expand the temporal period for sensor use, and extend the temporal sensor-use period earlier into the flight, such as when a thicker atmosphere is present.

The coating 24 may have a sufficient number of layers to allow reuse of the window 20 in multiple flights, or otherwise in multiple exposures to hypersonic flow. This may be valuable in reusable flight vehicles intended for use in multiple flights. For such multi-use flight vehicles the window 20 need not be changed for each new flight.

The window 20 may be used in any of a wide variety of hypersonic flight vehicles. Such flight vehicles may include aircraft and/or spacecraft (or vehicles configured to operate in both atmosphere and in space). Non-limiting examples of such vehicles include hypersonic airplanes, space planes, unmanned vehicles, missiles, and satellites.

Figure 6:
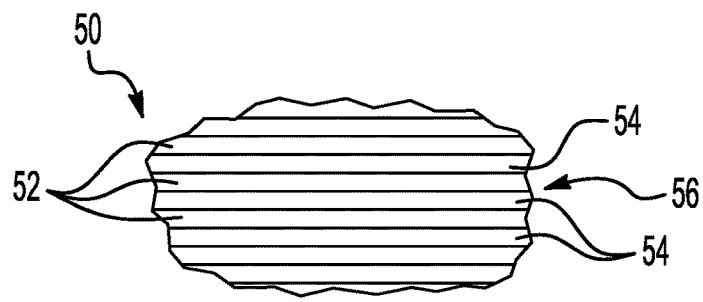
FIG. 6 is a magnified side view of a portion of an optical window, according to another embodiment of the invention.

FIG. 6 shows an alternative window 50, in which the entire window is made up of coated materials. The window 50 has first materials layers 52 and second materials 54, in a stack of alternating layers of the different materials. This series of alternating material layers is assembled on top of a region of graded index of refraction where the grading is from the index of refraction of the last member of the alternating material stack down to the index of refraction of the medium on the underside of the window. Typically this index of refraction will be equal to or similar to that of dry air. The window 50 differs from the window 20 (FIG. 2) in that it has no window substrate 22 (FIG. 2). The material sequence is the same as that shown in FIG. 3A, except the substrate 22 is not included in the assembly. In effect that the window 50 is completely made up of an anti-reflection "coating" 56.

Figure 7A:
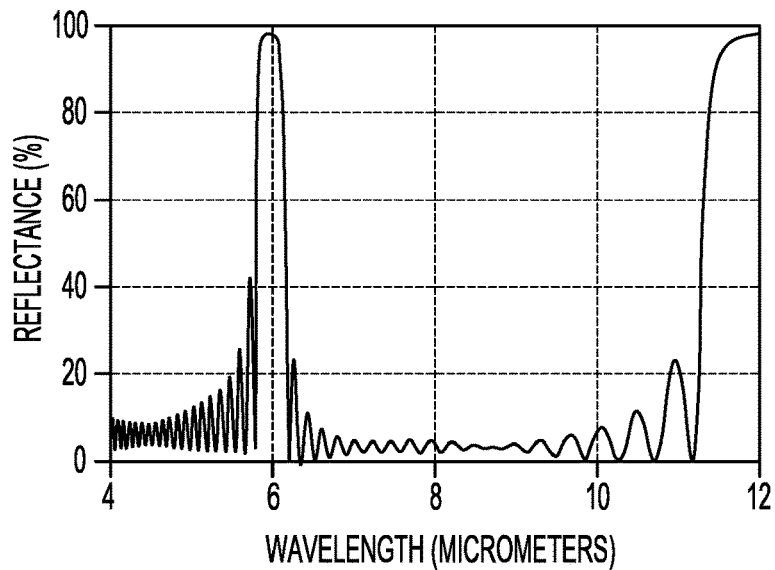
FIG. 7A is a graph of optical reflectance of a window that includes pairs of an $MgO$—$Dy_2O_3$ bi-layer, according to an embodiment of the invention.
Figure 7B:
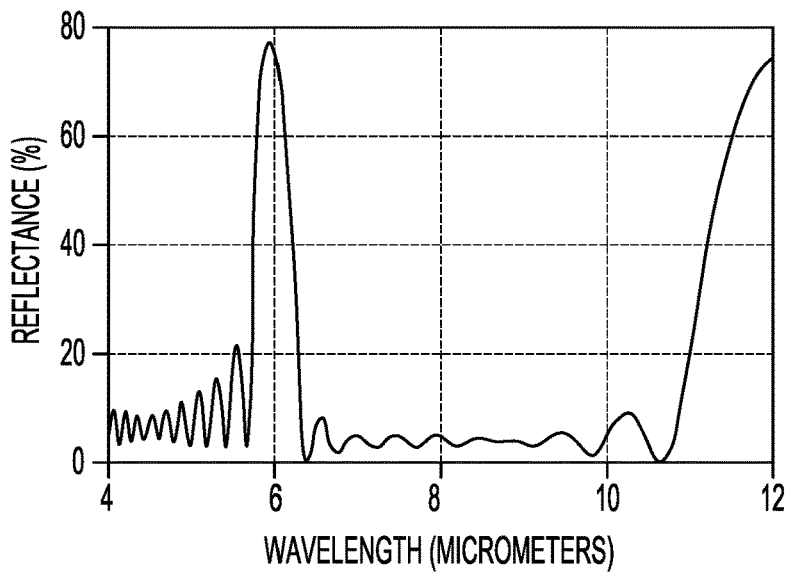
FIG. 7B is a graph of optical reflectance of the window of FIG. 7A, with some of the layers removed.

FIGS. 7A and 7B show performance of an example configuration for an anti-reflection coating that provides a bandpass optical characteristic optimized to pass 8.0 µm radiation. This example corresponds to the coating structure described in FIG. 3B with the substrate 22 removed. Recall from FIG. 5a that the optical reflectance of an uncoated Germanium window substrate in the 7.0-9.0 µm band is flat at 35.6%. FIG. 7a shows the reflectance of a germanium substrate coated with an outer region of 20 pairs of an MgO—$Dy_2O_3$ bi-layer on top of a region of graded index of refraction. The MgO layers are one quarter optical wavelength thick at 8.0 µm, for example 1.356 µm thick. The $Dy_2O_3$ layers are one half optical wavelength thick at 8.0 µm, for example 2.27 µm thick. The graded index of refraction is from from n=1.356 to n=1.0, over a thickness of 8 µm. The average reflectance of this coating in the 7.0-9.0 µm band is 3.68%.

FIG. 7B shows reflectance of a germanium substrate coated with an outer region of 10 pairs of an MgO and $Dy_2O_3$ bi-layer, over a graded index of refraction. The configuration of the individual coating bi-layers and the graded index of refraction region is the same as described above with regard to FIG. 7A. The average reflectance of this coating in the 7.0-9.0 µm band is 3.70%. It is seen the removal of 10 bi-layers of MgO/$Dy_2O_3$ has minimal effect upon the average in-band anti-reflection characteristic of this coating. In this example, 10 unit cells is equivalent to 10*(1.356+2.27) µm, or 36.3 µm of ablation.

The cases where the coating must only provide a band reject characteristic the index if refraction of the substrate does not alter the specification for the coating stack. Therefore window 50 designed for band rejecting characteristics over the same band of wavelengths may use the same specification for the alternating multilayer unit cells as window system 20.

The materials, thicknesses, and other variations for the layers 52 and 54 may be similar to those described above with regard to the layers 32 and 34 (FIG. 3). Some variations may be made in composition and/or thickness in order to achieve desired mechanical properties for the window 50.

Figure 8:
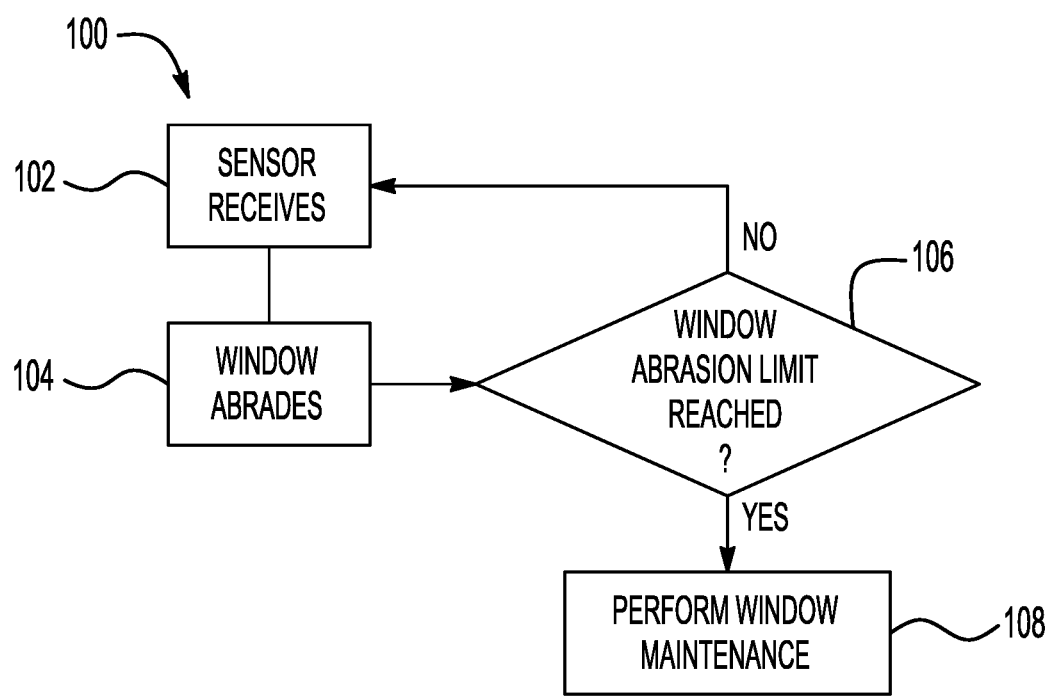
FIG. 8 is a high-level flow chart of a method of using an optical window, according to an embodiment of the invention.

FIG. 8 shows steps of a method 100 of optical sensing from a hypersonic vehicle, such as the hypersonic vehicle 10 (FIG. 1). In step 102 the sensor, such as a sensor 12 (FIG. 1), receives light signals, data, and/or information, through a window of the hypersonic vehicle. The window may be windows described, such as the window 20 (FIG. 2) or the window 50 (FIG. 6), having multiple alternating layers of different materials, which may broadly be considered a coating, whether or not there is an underlying window substrate.

In step 104 the method includes abrasion of the window as hypersonic flow moves past the window. The abrading (or eroding) removes some of the layers of the window (or coating) while leaving other layers in place, which maintains optical characteristics of the window.

In step 106 a determination may be made as to whether a window abrasion limit has been reached.

The sensor may then operate without substantial change in performance as ablation continues during flight. If in step 106 the determination is made that the window abrasion limit has been reached, then in step 108 window maintenance may be performed.

Although for clarity of description the invention has been described with respect to coatings applied to planar (flat) window substrates the invention applies equally to curved window surfaces that may be concave, convex, or doubly curved.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An optical window comprising:
multiple alternating layers of different materials;
wherein an optical sensor associated with the optical window is configured to receive a light and/or signals through the optical window;
wherein the optical window, while receiving the signals, is configured to:
have some of the multiple alternating layers removed responsive to hypersonic flow past the optical window while leaving in place other of the multiple alternating layers; and
maintain anti-reflection and/or band rejecting optical characteristics over a range of wavelengths of the light as some but not all of the multiple alternating layers, including at least one of the layers of each of the different materials, are removed responsive to hypersonic flow past the optical window; and
wherein one of the different materials is a material resistant to removal and includes zirconium, yttrium, or dysprosium.

2. The optical window of claim 1,
further comprising a window substrate;
wherein the multiple alternating layers constitute an anti-reflection coating on a major surface the window substrate.

3. The optical window of claim 2, wherein the anti-reflection coating is configured to operate anti-reflectively when some of the layers are removed.

4. The optical window of claim 1,
further comprising a window substrate;
wherein the multiple alternating layers constitute a wavelength rejecting coating on a major surface the window substrate.

5. The optical window of claim 1, wherein the layers all are one quarter wavelength in optical thickness at the center of the operating wavelength range.

6. The optical window of claim 1, wherein the layers alternate between one quarter wavelength of an optical thickness and one half of an optical wavelength at the center of the operating wavelength range.

7. The optical window of claim 1, wherein some of the layers have different optical thicknesses than other of the layers.

8. The optical window of claim 1, wherein the multiple alternating layers include at least 5 layers of the different materials.

9. The optical window of claim 1, wherein the materials for the layers includes materials selected from a group consisting of MgO, $ZrO_2$, $Y_2O_3$, $Dy_2O_3$, diamond, $Al_2O_3$, MgF2, YF3, YbF3, and Lanthanide oxides and fluorides.

10. The optical window of claim 1,
wherein one of the materials is more ablation-resistant than another of the materials; and
wherein the one of the materials that is more ablation-resistant is an oxide material.

11. The optical window of claim 1,
wherein one of the materials is less ion-reactive than another of the materials; and
wherein the one of the materials that is less ion-reactive is a fluoride material.

12. The optical window of claim 1, wherein one of the materials has lower optical absorption than another of the materials.

13. The optical window of claim 1, wherein the window is configured to operate with some of the layers removed.

14. The optical window of claim 1, wherein the layers are vacuum-deposited layers.

15. The optical window of claim 1,
further comprising a region of graded optical index of refraction;
wherein the multiple alternating layers overlie the region of graded optical index of refraction.

16. The optical window of claim 15,
further comprising a substrate;
wherein the region of graded optical index of refraction is between the substrate and the multiple alternating layers.

17. The optical window of claim 16,
wherein the optical window is part of a hypersonic vehicle; and
wherein the hypersonic vehicle includes a sensor that views through the optical window.

18. A method of optical sensing from a hypersonic vehicle, the method comprising:
  receiving light at a sensor of the hypersonic vehicle, through an optical window of the hypersonic vehicle;
  wherein the optical window includes repeating alternate layers of different materials, through which the light pass; and
  wherein, while receiving the signals, hypersonic flow past the window removes some of the layers of the window through which the light pass, while leaving in place other of the layers of the window.

19. The method of claim 18, wherein the window is unshrouded throughout flight of the hypersonic vehicle.

20. The method of claim 18, further comprising re-using of the window in another flight of the hypersonic vehicle, after the some of the layers of the window have been removed.

21. An optical window comprising:
  multiple alternating layers of different materials;
  wherein the optical window maintains anti-reflection and/or band rejecting optical characteristics over a range of wavelengths as some but not all of the multiple layers, including at least one of the layers of each of the different materials, are removed;
  wherein the optical window is a substrateless window, with the multiple alternating layers of the different materials constituting a standalone structure; and
  wherein the multiple alternating layers of the different materials includes at least alternating layers of the different materials.

22. The optical window of claim 1, wherein the material having resistance to removal is selected from the group consisting of $ZrO_2$, $Y_2O_3$, $Al_2O_3$, and $Dy_2O_3$.

23. The optical window of claim 1, wherein the material having resistance to removal is $Dy_2O_3$.

24. The optical window of claim 23, wherein the different materials also include MgO.

25. The optical window of claim 1, wherein the material having resistance to removal is $Al_2O_3$.

26. The optical window of claim 25, wherein the different materials also include $MgF_3$.

* * * * *